C. N. ROBINSON.
HERMETIC CLOSURE FOR RECEPTACLES.
APPLICATION FILED JULY 14, 1919.

1,346,257.

Patented July 13, 1920.

Inventor:
Clarence Morton Robinson
Harry R. Williams
Atty.

UNITED STATES PATENT OFFICE.

CLARENCE NORTON ROBINSON, OF PALATINE BRIDGE, NEW YORK.

HERMETIC CLOSURE FOR RECEPTACLES.

1,346,257.  Specification of Letters Patent.  Patented July 13, 1920.

Application filed July 14, 1919. Serial No. 310,748.

*To all whom it may concern:*

Be it known that I, CLARENCE NORTON ROBINSON, a citizen of the United States, residing at Palatine Bridge, in the county of Montgomery and State of New York, have invented a new and useful Improvement in Hermetic Closures for Receptacles, of which the following is a specification.

This invention relates to the construction of closures for tumblers, jars and the like receptacles for containing food products, which are designed to be held sealed by atmospheric pressure.

The object of the invention is to provide a closure construction by means of which a tight and sure hermetic seal can be insured with a simple and small gasket arranged on an easily and cheaply formed seat on the exterior of the receptacle and a cap having a minimum amount of metal in its skirt which is shaped so as to press the small gasket closely to its seat with a maximum effect as a result of the exterior air pressure after air has been exhausted from the interior of the receptacle.

In attaining this object the gasket seat is formed by providing a shoulder on the exterior near the rim with its upper face inclining at less than a right angle to the outer wall of the receptacle. Located on this shoulder about the rim is a small elastic gasket that is rectangular in cross section. The cap has a flaring skirt so shaped that when first placed over the mouth of the receptacle its flaring wall rests lightly upon the upper and outer corner of the gasket in such manner as not to materially obstruct the withdrawal of air from the receptacle during the exhausting process, but when forced down for sealing, after the interior air has been exhausted, it will exert a pressure diagonally of the gasket or against opposite angles and force the gasket into its pocket-like seat, thus taking advantage of the greatest diameter of the gasket when expanding it into sealing position and thereby causing the gasket, although small, to spread over and lie closely against a considerable area of the receptacle.

Figure 1:
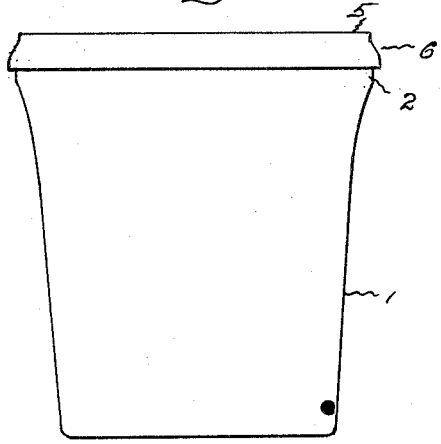
Figure 2:
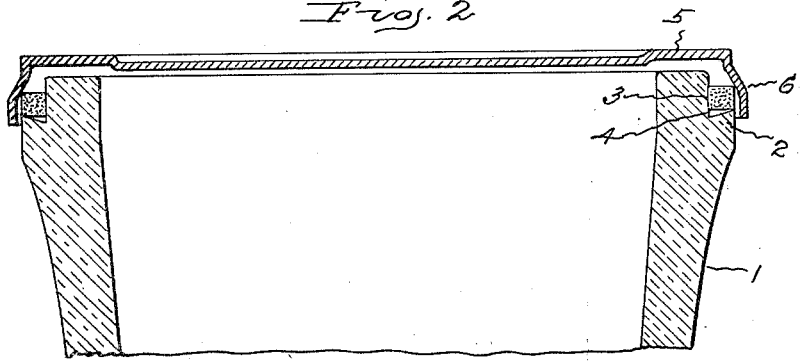
Figure 3:
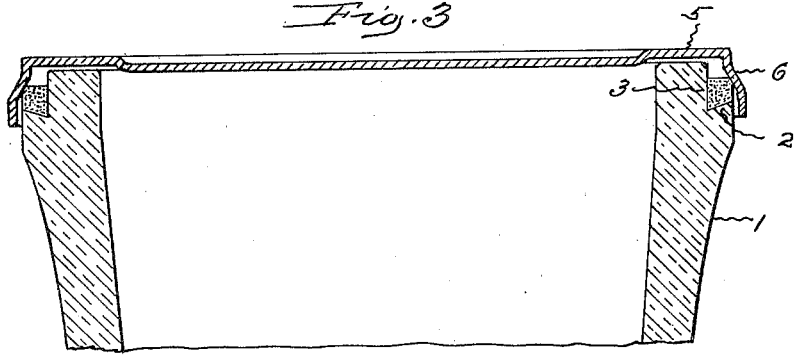

In the accompanying drawings Figure 1 shows a side elevation of a jar sealed with a closure embodying this invention. Fig. 2 shows on larger scale a diametrical section of the upper portion of the jar and the closure placed on top in the position occupied before air is exhausted and sealing is effected. Fig. 3 is a similar view with the parts in the relation occupied after sealing.

The receptacle 1 may be made in the shape of a jar, tumbler, can or the like, of glass, porcelain or other desirable material, with a shoulder 2 around the exterior near the rim. This shoulder is shaped as illustrated so that its upper face will incline at an angle less than 90° with relation to the exterior wall of the receptacle about the rim, and thus form a pocket-like gasket seat.

The gasket 3 is made of rubber or other suitable elastic material in the form of a band of stock that is rectangular in cross section. This gasket is stretched over the rim of the receptacle and is seated on the inclined gasket shoulder, and when first placed in position there is a space 4 between its under side and the upper face of the shoulder, Fig. 2.

The cap 5 which is preferably made of sheet metal but may be made of other thin sheet material having the requisite stiffness, has a downwardly and outwardly flaring skirt 6 about its edge. This skirt is of such a size and is so shaped that when the cap is first placed over the top of the receptacle the inner wall of the flaring portion of the skirt rests lightly upon the thin and flexible upper outer corner of the gasket as shown in Fig. 2. Closed in this manner and with the cap in this condition the receptacle is placed in the ordinary exhausting apparatus commonly employed for the purpose, and after the air has been exhausted from the interior the cap is pressed down in the well known way. Thereafter the excess air pressure on the exterior holds the cap in place and keeps the receptacle tightly and securely sealed. When the cap is pressed down for sealing, the gasket is forced into its seat on the shoulder so as to fill the space which was left when the gasket was first placed about the rim of the receptacle.

The inclined shoulder which provides the gasket seating pocket about the exterior near the rim is readily formed with the existing apparatus commonly employed in the manufacture of jars, tumblers and similar receptacles of this class, and this shoulder can be made narrow and quite near the top of the receptacle. This construction permits the use of a small, easily procured, and cheap gasket and enables a relatively shallow and cheaply formed cap to be used, for the skirt need extend downward only sufficiently far to protect the gasket which is small and near the top of the receptacle. This, of course, reduces to a minimum the quantity of gasket material and the amount of metal necessary for producing the cap. When the cap is pressed down for sealing the receptacle the gasket is forced diagonally or across its greatest diameter down into its seat without any tendency to slide outward off from the seat, and the greater the pressure on the cap the tighter the seal.

The invention claimed is:—

1. For hermetically sealing substances, the combination of a receptacle having on its exterior below the rim an upwardly facing shoulder that inclines outward at less than right angles to the exterior wall of the rim, a rectangular elastic gasket located on said shoulder, and a cap having a downward and outward flaring skirt with the inner wall of the flaring portion of said skirt shaped to engage the upper and outer angle of said gasket and force the gasket diagonally to its seat on said shoulder when the cap is held down by exterior air pressure.

2. For hermetically sealing substances, the combination of a receptacle having an upwardly facing shoulder on its exterior below the rim, an elastic gasket of square cross section located on said shoulder, and a cap having a flaring skirt with the inner wall of the flaring portion of said skirt larger in diameter than the outer wall of said shoulder and inclined so as to engage the outer and upper corner of the gasket only when the cap is placed in position for sealing and compress the gasket diagonally when sealed.

CLARENCE NORTON ROBINSON.